Jan. 31, 1933.  H. M. McLEARN  1,895,722
GEAR SELECTOR
Filed March 22, 1932  2 Sheets-Sheet 1

Inventor
Herbert M. McLearn
By Clarence A. O'Brien
Attorney

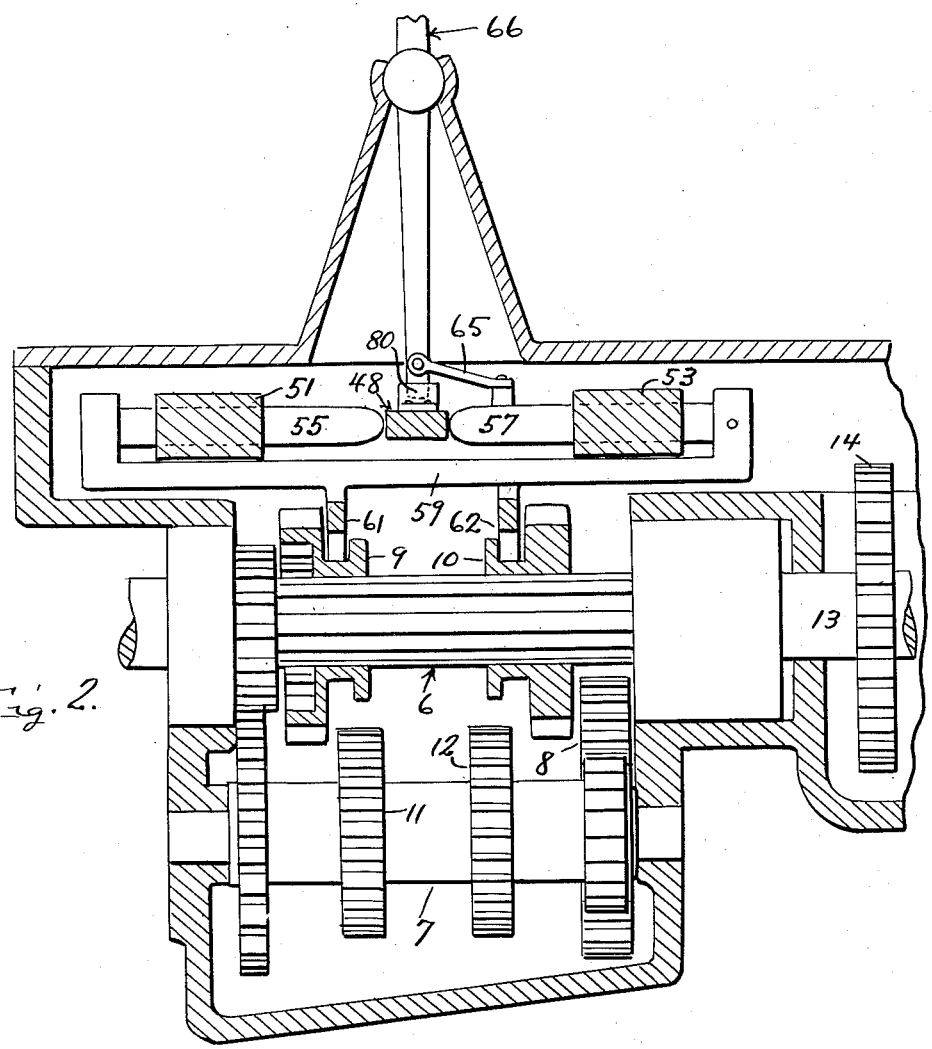
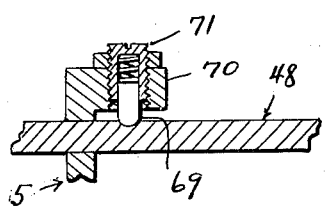

Patented Jan. 31, 1933

1,895,722

UNITED STATES PATENT OFFICE

HERBERT M. McLEARN, OF WAUKEGAN, ILLINOIS

GEAR SELECTOR

Application filed March 22, 1932. Serial No. 600,544.

My invention relates to gear selectors, and particularly to gear selectors for use with change-speed devices, such as automotive transmissions.

It is an important object of my invention to provide a gear selector of the type described which is extraordinarily simple in organization and construction, which can be manufactured and installed on present-day transmissions at a comparatively low cost, and which once engaged is entirely automatic in its operation in all forward speeds of the change-speed device or transmission.

It is also an important object of my invention to provide a gear selector device for a conventional automobile transmission, which can be readily installed thereon or formed as a part thereof, the conventional transmission of today being of the free-wheeling type.

Other objects and advantages of my invention will be apparent from a reading of the following description, taken in connection with the drawings, wherein for purposes of illustration I have shown a preferred embodiment of my invention.

In the drawings:—

Figure 2 is a longitudinal vertical sectional view taken approximately on the line 2—2 of Figure 1 looking in the direction of the arrows.

Figure 3 is a detailed vertical sectional view taken approximately on the line 3—3 of Figure 1.

Figures 1, 4:
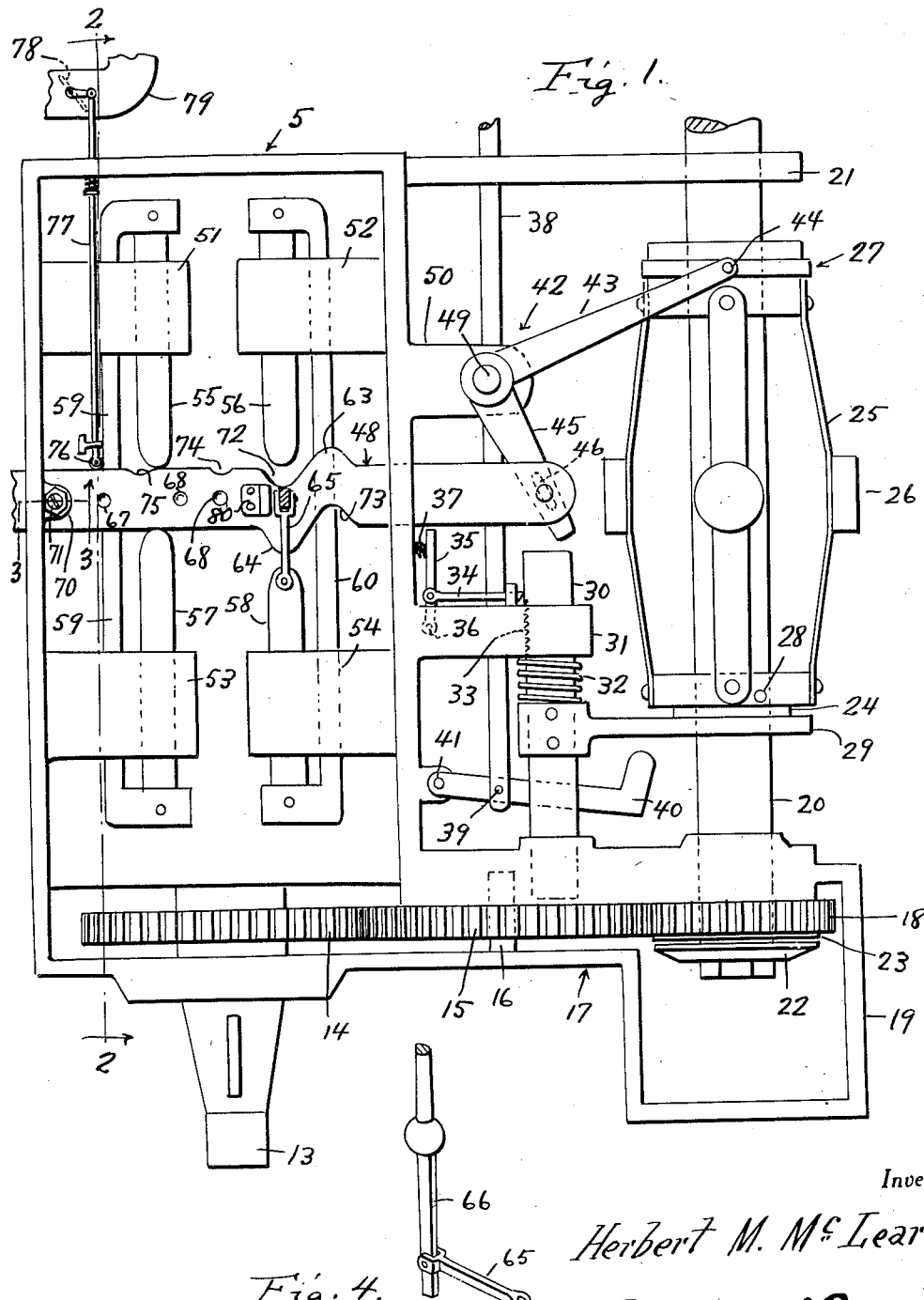
Figure 1 is a top plan view of a transmission equipped with my invention.
Figure 4 is a perspective view of the lower portion of the shift lever.

The device of the invention provides for shifting the gears of the transmission or the like without the use of the clutch, except in starting, stopping, and reversing.

Referring in detail to the drawings, wherein like numerals refer to like parts throughout the same, the numeral 5 generally designates a transmission casing having mounted therein the usual main shaft 6, the countershaft 7 and another countershaft carrying the gear 8, and not shown in the drawings, these countershafts being located below the main shaft 6 or in any other suitable relationship. The main shaft 6 carries forwardly the usual third or high speed gear 9 and on its rear portion the usual second speed gear 10, the countershaft 8 carrying forwardly the low speed gear 11 and rearwardly the reverse gear 12. Further description of this transmission construction is not considered necessary as a conventional form is employed herein for illustrative purposes.

Outwardly of the casing 5 at the rear thereof the drive shaft 13 carries a gear 14 which is meshed with a gear 15 carried on a stub-axle 16 in a lateral extension 17 of the casing. The gear 15 in turn meshes with another gear 18 carried in an expanded portion 19 of the lateral extension 17. Journaled in the lateral extension 17 is a longitudinally extended shaft 20 which is journaled at its forward end in a bracket 21. The shaft 20 is slidable back and forth for a purpose to be described.

On the rearward end of the shaft 20 is carried a clutch member 22 which is adapted to cooperate with a clutch face 23 carried by the gear 18.

Forwardly of the extension 17 there is fixed to the shaft 20 a collar 24 which has connected thereto spring members 25 each of which has a weight 26 centrally thereof. The other ends of the members 25 are connected to a collar 27 which is slidable on the shaft 20. The collar 24 is keyed or otherwise fixed by suitable means 28 for rotation with the shaft 20.

Means for sliding the shaft 20 back and forth consists of a fork 29 in cooperative relation with the collar 24 and carried fixedly by a slide member 30 which is carried at one end in the extension 17 and at the other end in a bracket 31. Between the fork 29 and the bracket 31 there is on the slide member 30 a spring 32 for normally keeping the slide member 30 moved rearwardly and consequently the shaft 20, whereby to maintain the clutch member 22 disengaged from the clutch face 23.

As indicated at 33 one side of the slide member 30 is provided with teeth or notches adapted to be engaged by a latch finger 34 which is pivoted to an intermediate portion of a lever 35 which is pivoted at one end as indicated at 36 to the bracket 31. The free end of the lever 35 is urged outwardly by a spring 37 engaged with the casing 5 whereby the finger 34 is kept engaged with the notches 33, whereby to lock the slide member 30 in adjusted position against rearward movement, whereby to lock the shaft 20 against rearward movement.

Means for moving the member 31 and the shaft 20 forwardly for engaging the clutch member 22, 23, so as to enable starting the automobile or the like in low gear, comprises the rod 38 which is connected by its forward end to the conventional clutch on the automobile or the like, and pivotally connected as at 39 at its rearward end to an intermediate portion of a lever 40. The lever 40 is pivoted at one end to the side of the transmission casing as indicated at 41. The free end of the lever 40 has a finger which is adapted to engage the fork 29 for pushing the same forwardly against the tension of the spring 32 and move the slide member 30 and the shaft 20 forwardly so as to engage the clutch member 22 with the clutch member 23. This causes the governor structure to be rotated.

It will be obvious that the governor structure comprising the spring members 25 already mentioned which carry the weights 26. As the speed of the governor increases, the spring members shorten and draw rearwardly the collar 27 which is slidable on the shaft 20. This movement is utilized for shifting or selecting the gears of the transmission according to the speed of the automobile. Through the agency of a bell crank lever 42, pivoted at 49 on a bracket 50 which has the outward end of its arm 43 connected to the collar 27 at 44, and the outward end of its arm 45 provided with a pin and slot connection 46 with the outer end of the slidable cam bar or plate 48 operative connection is made between the governor and the cam bar.

At either side of the interior of the transmission casing 5 are constructed inwardly projecting blocks 51, 52 and 53, 54 each of which slidably accommodates one of the forwardly and rearwardly movable shifting fingers 55, 56 and 57, 58, which are, with the exception of the finger 58, to be engaged by the cam lobes of the shifting bar. A gear shifting yoke 59 operatively connects the fingers 55 and 57, and another gear shifting yoke 60 operatively connects the fingers 56 and 58.

The finger 55 relates to the third or high speed gear of the transmission, the finger 56 to the first or low speed gear, the finger 57 to the intermediate or second speed gear, and the finger 58 to the reverse gear.

As seen in Figure 2, the yoke 59 has a forward depending fork 61 engaged with the high speed gear 9, while the yoke 60 has a rearward depending fork 62 engaged with the low speed gear 10.

The cam bar 48 is transversely slidable in the transmission casing and between the forwardly shifting fingers as seen in Figures 1 and 2. A projecting cam lobe 63 is adapted upon the bars being moved in a direction away from the governor to engage and move first the finger 56 and then the finger 55, while a cam lobe 64 on the opposite side of the cam bar is adapted to engage and move the finger 57. A link 65 is operatively connected between a rockably mounted manual shift lever 66 and the reverse gear shifting finger 58 which, as pointed out above, is not operated by the cam bar 48. The lower end of the manual shift lever 66 is seen in Figures 1 and 2 to be located adjacent to the upper side of the cam bar 48 whereby to engage a bracket 80 on the cam bar so that the lever may be utilized for moving the cam bar for shifting the gears of the transmission independently of the governor.

Also on the upper surface of the cam bar 48 are depressions 67, and 68, 68 with which a spring urged detent 69 carried in a bracket 70 at the left hand side of the casing is adapted to engage for releasably locking the cam bar in different shifted positions. As seen in Figure 3 the spring urged detent 69 is adjustably carried in a screw arrangement 71.

On the same side of the cam bar 48 as the cam lobe 63 and to the left thereof there is provided a depression 72 for permitting proper clearance of opposed shifting fingers, and another similar formation 73 is provided on the opposite side of the bar 48 and to the right of the cam lobe 64. On the same side of the cam bar 48 as the cam lobe 63 are longitudinally spaced notches 74 and 75 which are provided to receive therein and permit rearward movement of a roller 76 on the rearward end of a spring moved control rod 77 connected to the butterfly valve 78 or other suitable control of the carburetor 79 of the internal combustion engine with which the device of my invention is employed. The roller 76 normally rides on the forward edge of the cam bar and through the control rod 77 conditions normal operation of the carbureter and hence of the engine. But when the roller 76 passes into one of the notches 74, 75, the carburetor fuel supply to the engine will be closed off, whereby to slow down the engine to the required speed for shifting the gears smoothly.

The manual shift lever 66 already referred to and with which the link 65 is connected, may be moved to a position to engage block 80 on the cam bar 48. This arrangement is provided so that the cam bar may be manually moved to the left into first gear shifting position for starting the automobile or the like, as without such manual engagement of first or low gear, the gears would be in neutral positions. The movement of the lever 66 so as to engage the block 80 and move the cam bar 48 is believed to be obvious.

For stopping the automobile, it is necessary to disengage the main clutch of the automobile. The rod 38 being connected to the said main clutch will be drawn forwardly and this results in moving the lever 40 into engagement with the fork 29 so as to move the slide member 30 forwardly. This engages the clutch members 22, 23, and locks slide member 30 in forward position by means of the spring urged finger 34.

In starting the automobile the main clutch is disengaged, the shifting lever 66 then moved to the right, thereby moving the cam bar 48 to the left so as to engage first speed or low speed gear the main or conventional automobile clutch then being put in the engaged relationship. When this has been achieved, the gear 14 on the drive shaft 13 will be revolved whereby to turn the gears 15 and 18 and the clutch member 23 thereon. The clutch members 22, 23 being then engaged will turn the shaft 20 and the governor mechanism. As the road speed of the automobile increases, the speed of the governor also will be correspondingly increased, so that the spring centrifugal members 25 will spread and shorten and draw the collar 27 rearwardly. The rearward movement of the collar 27 moves the bell crank lever 42 whereby to move the cam bar 48 toward the left. When the governor has reached second gear changing speed at which it causes engagement of the second speed gear, the cam bar 48 will have arrived at a position in which the cam lobe 63 is just leaving the shifting finger 56 and the cam lobe 64 is just arriving into position to move the second or intermediate gear shifting finger 57. During this movement of the cam bar the roller 76 of the carburetor control rod 77 will have passed into the notch 75, and the carburetor will have been caused to slow down the motor so that the gears engage and disengage smoothly. When by further movement of the cam bar in this progression the third or high speed gear has been engaged through the action of the cam lobe 63 on the finger 55, the arm 45 of the bell crank lever 42 will have reached a position in which it strikes the lever 35 of the latch mechanism 34, 35 and withdraws the finger 34 from the slide 30 so that the spring 32 is permitted to force the slide member 30 rearwardly, thereby carrying the shaft 20 rearwardly in a quick action which disengages the clutch members 22, 23 and leaves the governor in a neutral unconnected condition. The transmission is then in direct drive in high or third gear.

Third or high gear will be maintained engaged until the main clutch is disengaged by the operator. Whenever it is desired to shift to a lower speed or to stop, the main clutch must be disengaged. As already stated, disengaging of the main clutch pulls the rod 38, the lever 40, the fork 29 and consequently the slide member 30 forwardly into a position wherein the slide member is locked by the latch mechanism 34, 35, the clutch members 22, 23 being engaged by the action. The governor mechanism will then be operatively connected.

When it is desired to come to a complete stop, the transmission being in high gear, it is necessary to disengage the main clutch of the automobile and then re-engage it after the automobile has slowed to an arbitrary speed of, say fifteen miles per hour or less, or to disengage the clutch and hold it disengaged until the automobile has come to a stop. While the automobile is moving at a speed of less than fifteen miles per hour in high gear, engaging and disengaging the clutch puts the governor mechanism into action, so that as the automobile's speed decreases to a stop, all of the cam lobes 63, 64 will be clear of the shifting fingers, the gears being then in the neutral position.

Putting the automobile in reverse gear is accomplished by moving the manual shifting lever 66 forwardly, whereby to push the link 65 connected to the reverse finger 58, rearwardly so as to move the reverse gear into mesh.

In all the shifting movements accomplished, except that of reversing, the spring detent 69 engages one of the depressions 67 or 68, 68, so as to maintain the cam bar against idle shifting, the spring detent having sufficient engagement with the cam bar to resist in complete deviations of the governor mechanism from gear changing speeds.

It will be obvious that by leaving the shifting lever 66 in the low speed position, the automobile will always be in first speed ready to move, which is a distinct advantage in traffic.

Thus it will be seen that I have provided a device for automatically shifting gears according to the requirements of road conditions and the speed of the automobile the gears being shifted always at the same car speed, thereby avoiding clashing and damage thereto. The coordination of the carburetor control with the shifting of the device also brings about a saving in fuel consumption. It will also be obvious that the device of my invention is composed of few and comparatively easily manufactured parts which are readily accessible and replaceable without disturbing other parts, and that the device is compact and occupies little space, does not add very much to the weight of the conventional transmission and the expense of installation is not great.

Though I have shown and described herein a preferred embodiment of the invention, it is to be definitely understood that I do not desire to limit the application of the invention thereto, but any change or changes may be made in materials and in the structure and arrangement of parts within the spirit of the invention and the scope of the subjoined claims.

What is claimed is:—

1. A gear selector for a change speed transmission comprising a gear shifting device, a governor mechanism, means for operatively connecting the governor mechanism to the gear shifting device, said mechanism being operable for shifting gears according to a predetermined ratio of speed between the drive of the transmission and a rotatable element, and latch means to hold the governor mechanism before and after each selection movement thereof against movement in one direction only, said latch means comprising pawl means, and ratchet teeth on said governor mechanism with which said pawl means is engaged.

2. The combination with an automotive change speed transmission including a clutch, of cam operated gear shifting means, a transversely movable cam bar for selectively operating the gear shifting means, governor controlled lever means movable for selectively moving the cam bar, a governor connectible to be driven from the transmission, and means connected for operation by the clutch for placing the governor in connection with the transmission, said governor controlled lever means being operatively connected to the cam bar.

3. The combination with an automotive change speed transmission including a clutch, of cam operated gear shifting means, a transversely movable cam bar for selectively operating the gear shifting means, a governor mechanism connectible to be driven from the transmission, governor controlled lever means movable for selectively operating the cam bar, said lever means being operatively connected to the cam bar, connection means between the clutch and the governor mechanism for connecting the governor mechanism to the transmission to be driven thereby, and latch means operatively engageable with the lever means for locking the governor mechanism against movement in one direction in different stages of its movement.

4. The combination with an automotive change speed transmission including a clutch, of cam operated gear shifting means, a transversely movable cam bar for selectively operating the gear shifting means, a governor mechanism connectible to be driven from the transmission, governor controlled lever means movable for selectively operating the cam bar, said lever means being operatively connected between the governor mechanism and cam bar, connection means between the clutch and the governor mechanism for connecting the governor mechanism to the transmission to be driven thereby, and latch means operatively engaging the governor mechanism for locking the governor mechanism in different stages of its movement, said latch means being releasable from locking position by the governor controlled lever means as the cam bar reaches high gear engaging position.

5. A transmission comprising a clutch, a change speed mechanism of the gear type, gear shifting means on the mechanism, automatic operating means for the gear shifting means including means slidable transversely relative to the axis of the gears of the mechanism, said automatic operating means comprising governor means connectible for operation by the change-speed mechanism, spring means for resisting connection of the governor means for operation by the said mechanism, spring urged latch means automatically engageable with a portion of the governor means for maintaining the same in connected position, lever means connected to the governor means and to the transversely slidable means for moving the gear shifting means in accordance with the action of the governor means, said lever means being also adapted to engage and release the latch means to permit the spring means to disconnect the governor means from the said mechanism when the shift into "high gear" is effected, and connection means connected to the clutch for operation thereby for moving the governor means into operative connection with the change-speed mechanism.

6. A transmission comprising a clutch, a change speed mechanism of the gear type, gear shifting means on the mechanism, automatic operating means for the gear shifting means including means slidable transversely relative to the axis of the gears of the mechanism, said automatic operating means comprising governor means connectible for operation by the change-speed mechanism, spring means for resisting connection of the governor means for operation by the said mechanism, spring urged latch means automatically engageable with a portion of the governor means for maintaining the same in connected position, lever means connected to the governor means and to the transversely slidable means for moving the gear shifting means in accordance with the action of the governor means, said lever means being also adapted to engage and release the latch means to permit the spring means to disconnect the governor means from the said mechanism when the shift into "high gear" is effected, and connection means connected to the clutch for operation thereby for moving the governor means into operative connection with the change-speed mechanism, and manual means connectible with the gear shifting means for moving the same into reverse gear engaging position.

7. The combination with a change-speed gear transmission, a governor controlled gear shifting means comprising cam actuated gear moving means, cam means for actuating the gear moving means, said cam means being slidable in a plane parallel to the axis of the gears and in a direction at right angles thereto, governor means, operating connection means for connecting the governor means for operation by the transmission, spring means for disconnecting the governor means, automatically engaging latch means for engaging a portion of the governor means for locking the same connected for operation by the transmission, and lever means operatively connected between the governor means and the cam means for sliding the cam means for changing gears, said lever means being further adapted to engage and release the latch means to permit the spring means to disconnect the operating connection means for the governor means.

8. The combination with a change-speed gear transmission, of governor controlled gear shifting means comprising cam actuated gear moving means, cam means for actuating the gear moving means, said cam means being slidable in a plane parallel to the axis of the gears and in a direction at right angles thereto, governor means, operating connection means for connecting the governor means for operation by the transmission, spring means for disconnecting the governor means, automatically engaging latch means for engaging a portion of the governor means for locking the same connected for operation by the transmission, and lever means operatively connected between the governor means and the cam means for sliding the cam means for changing gears, said lever means being further adapted to engage and release the latch means to permit the spring means to disconnect the operating connection means for the governor means, and manual means for effecting connection of the governor operating connection means.

9. The combination with a change-speed gear transmission, of governor controlled gear-shifting means comprising cam actuated gear moving means, cam means for actuating the gear moving means, said cam means being slidable in a plane parallel to the axis of the gears and in a direction at right angles thereto, governor means, operating connection means for connecting the governor means for operation by the transmission, spring means for disconnecting the governor means, automatically engaging latch means for engaging a portion of the governor means for locking the same connected for operation by the transmission, and lever means operatively connected between the governor means and the cam means for sliding the cam means for changing gears, said lever means being further adapted to engage and release the latch means to permit the spring means to disconnect the operating connection means for the governor means, and manual means for effecting connection of the governor operating connection means, said cam actuated gear moving means being located in a plane parallel to the axis of the gears and at one side of the gears.

In testimony whereof I affix my signature.

HERBERT M. McLEARN.